(No Model.)
J. W. SPANGLER.
HARNESS.
No. 338,797.  Patented Mar. 30, 1886.
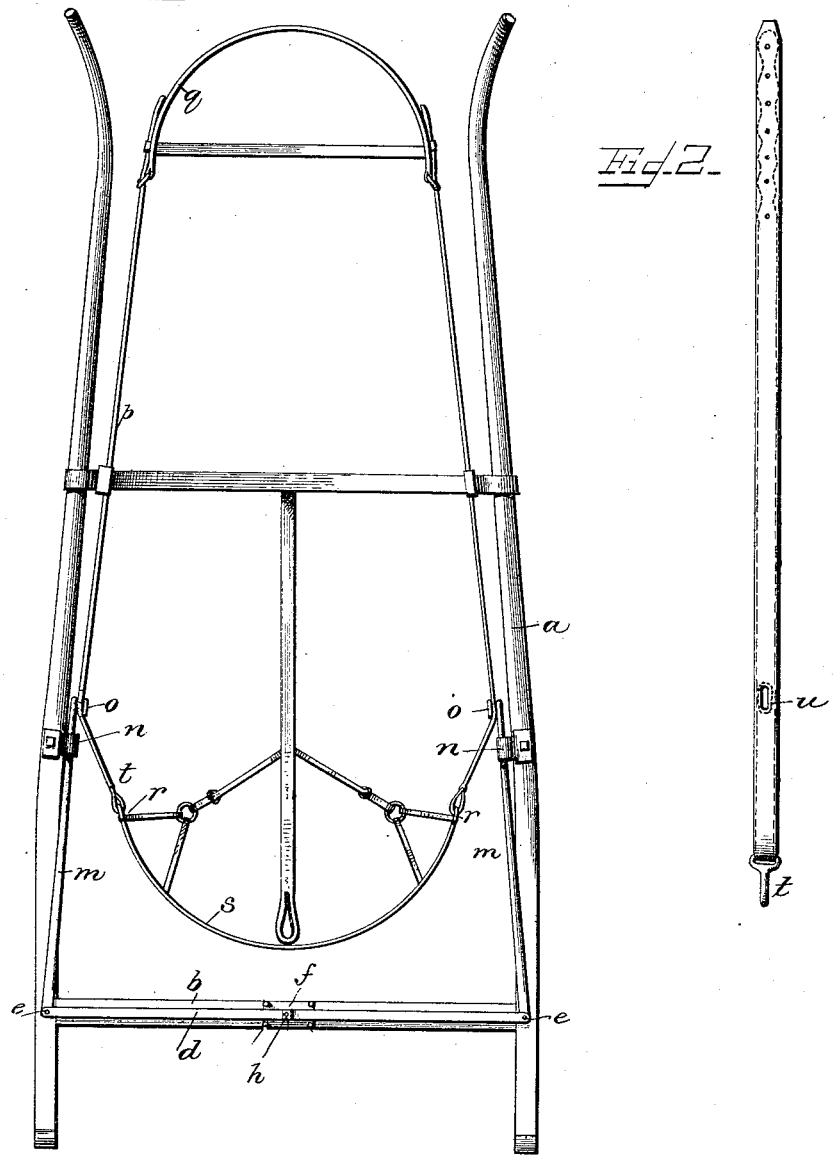
WITNESSES
F. L. Ourand
Harry Y. Davis
INVENTOR
Jacob W. Spangler,
by Wm H. Finckel
Attorney.

UNITED STATES PATENT OFFICE.

JACOB W. SPANGLER, OF YORK, PENNSYLVANIA.

HARNESS.

SPECIFICATION forming part of Letters Patent No. 338,797, dated March 30, 1886.

Application filed July 3, 1885. Serial No. 170,606. (No model.)

*To all whom it may concern:*

Be it known that I, JACOB W. SPANGLER, a citizen of the United States, residing at York, in the county of York and State of Pennsylvania, have invented a certain new and useful Improvement in Harness, of which the following is a full, clear, and exact description.

The object of this invention is to provide a simple, strong, and durable harness, whereby the animal may be readily attached to and detached from the vehicle without leaving any parts of the harness to be tied up or liable to drag.

The invention comprises a modification of the ordinary whiffletree in which arms extend well forward along the flanks of the animal, and short traces which run from the breast-strap or hames back to the rings on the breeching, and are thereto connected by snap-hooks or other devices, the said traces connecting at intermediate points with buttons on the ends of the said arms, so that said traces and arms may be used for both pulling and backing the vehicle, as I will now proceed to more particularly set forth and claim.

In the accompanying drawings, in the two figures of which like parts are similarly designated, Figure 1 is a bottom plan view of shafts with my invention applied. Fig. 2 is a side view of the trace.

The shafts $a$ may be of any approved construction, with the ordinary cross-bar, $b$, connecting them at their rear ends. I prefer to arrange the whiffletree on the under side of this cross-bar, so as to get it clear of catching the hairs of the animal's tail; but the ordinary arrangement may be employed. The whiffletree $d$ is shown applied to the under side of the cross-bar $b$ by a plate, $f$, and bolt $h$; but my invention is not limited to such construction.

To the whiffletree, by bolts $e$ or other devices, are attached arms $m$, which extend well forward along the flanks of the animal (say from about two to two and a half feet) from the whiffletree, and are connected to the shafts, preferably, by leather guides $n$, which latter are clamped to the shafts and readily detachable for renewal or repair. The ends of the arms $m$ are provided with buttons $o$. The arms $m$ may be simply pieces of iron rod shaped to connect with the whiffletree and headed. The arms $m$ may be applied to an ordinary metal or wooden whiffletree. The traces $p$ are of leather or other usual material, and extend from the breast-band $q$ or hames, to which they are adjustably secured, as usual, back to the rings $r$ on the breeching $s$, with which they are connected by snap-hooks $t$ or other readily-operable devices. An eye or hole, $u$, is made in each trace at a point which will enable one to properly hitch the draft-animal to the vehicle by engagement of the eyes of said traces with the buttons $o$ on the arms $m$.

After the harness is once upon the animal it may be hitched or unhitched by engaging the traces by their eyes with the buttons or the arms $m$, or by disengaging them respectively. The traces are held at both ends, and hence need no tying up, and there are no breeching-straps to be operated.

The length of the harness is suited to the animal by adjustment of the traces at the breast-strap or hames, so that but one eye in each trace for engagement with the whiffletree-arms is necessary.

It will be noticed that the vehicle may be both drawn forward and pushed backward by the traces acting through the arms and whiffletree.

The traces may be integral with the breast-strap, and their adjustment to the length of the horse may be made at the breeching end by strap-like extensions running through the breeching-rings and engaging buckles or snap-hooks or other fastenings at or near the points of attachment to the whiffletree-arms.

What I claim is—

1. In a harness, the traces reaching from the breast-strap or hames to the breeching-rings and secured to each, and provided with eyes to engage arms extending forward from the whiffletree to hitch the animal to a vehicle, and adapted to be disengaged therefrom to completely unhitch the animal, substantially as described.

2. The combination, with a harness having traces provided with eyes or openings $u$, and extending from the breast-strap or hames to the breeching-rings and secured thereto, of a whiffletree having arms extending forward along the shafts and provided with buttons to engage the eyes in the traces, substantially as described.

In testimony whereof I have hereunto set my hand this 2d day of July, A. D. 1885.

JACOB W. SPANGLER.

Witnesses:
JOHN H. PARKER,
GEORGE B. KRABER.